US012795712B2

(12) United States Patent
Dehghan et al.

(10) Patent No.: US 12,795,712 B2
(45) Date of Patent: Nov. 10, 2026

(54) CROSS-LAYER ENERGY EFFICIENT RADIO ACCESS NETWORK POWER CONTROL

(71) Applicant: Dell Products L.P., Round Rock, TX (US)

(72) Inventors: Hoda Dehghan, Kanata (CA); Gwenael Poitau, Montreal (CA)

(73) Assignee: Dell Products L.P., Round Rock, TX (US)

( * ) Notice: Subject to any disclaimer, the term of this patent is extended or adjusted under 35 U.S.C. 154(b) by 667 days.

(21) Appl. No.: 18/350,854

(22) Filed: Jul. 12, 2023

(65) Prior Publication Data

US 2025/0024484 A1 Jan. 16, 2025

(51) Int. Cl.

| | |
|---|---|
| ***H04W 72/542*** | (2023.01) |
| ***G06N 20/00*** | (2019.01) |
| ***H04B 7/02*** | (2018.01) |
| ***H04W 52/24*** | (2009.01) |
| ***H04W 72/044*** | (2023.01) |
| ***H04W 88/18*** | (2009.01) |

(52) U.S. Cl.

CPC ............ *H04W 72/542* (2023.01); *H04B 7/02* (2013.01); *H04W 72/0473* (2013.01); *H04W 88/18* (2013.01)

(58) Field of Classification Search

CPC ........ H04B 7/02; H04W 7/0452; G06N 20/00

See application file for complete search history.

(56) References Cited

U.S. PATENT DOCUMENTS

| | | | | |
|---|---|---|---|---|
| 2018/0124694 | A1* | 5/2018 | Pefkianakis | H04W 72/541 |
| 2019/0037418 | A1* | 1/2019 | Gunasekara | H04B 7/0617 |
| 2022/0014963 | A1* | 1/2022 | Yeh | H04W 28/0268 |
| 2022/0022061 | A1* | 1/2022 | Hariharan | H04B 17/336 |
| 2023/0006748 | A1* | 1/2023 | Ryu | H04B 17/336 |

(Continued)

OTHER PUBLICATIONS

Hossain, et al. "Energy Saving Game for Massive MIMO: Coping With Daily Load Variation" IEEE Transactions on Vehicular Technology, vol. 67, No. 3, Mar. 2018, 13 pages.

(Continued)

*Primary Examiner* — San Htun

(74) *Attorney, Agent, or Firm* — Amin, Turocy & Watson, LLP

(57) ABSTRACT

The technology described herein is directed towards a distributed cross-layer intelligent power control engine in a communications network architecture that determines power control per user equipment (UE) per access point, using an AI/ML model at each layer. One application (e.g., in a non-real time controller) outputs candidate minimum required signal-to-noise-plus-interference ratio (SINR) policy, and another application (e.g., in a near-real time controller) adjusts the candidate SINR data to provide an environment-aware refined SINR threshold. A third, real time application (e.g., in a real time controller) determines the real time power allocation coefficients per UE per access point based on current conditions such as channel coefficients/parameters and/or UE enrichment information. The distributed cross-layer intelligent power control engine can optimize spectral efficiency and energy efficiency within SINR constraints for a group of UEs based on policy data, and adjust as the network environment changes.

20 Claims, 11 Drawing Sheets

(56) References Cited

U.S. PATENT DOCUMENTS

| | | | | |
|---|---|---|---|---|
| 2023/0062443 | A1* | 3/2023 | Chakraborty ......... | H04W 24/04 |
| 2024/0162955 | A1* | 5/2024 | Whinnett .............. | H04W 24/10 |

OTHER PUBLICATIONS

"O-RAN Working Group 1 (Use Cases and Overall Architecture) O-RAN Architecture Description" O-RAN.WG1.OAD-R003-v08.00, 2023, 40 pages.
International Search Report and Written Opinion for PCT Application No. PCT/US2023/036209, mailed Mar. 22, 2024, 14 pages.
Garg Navneet et al: "Reinforcement Learning based Per-antenna-Discrete Power Control. for Massive MIMO Systems", 2020 54th Asilomar Conference on Signals, Systems, and Computers, IEEE, Nov. 1, 2020 (Nov. 1, 2020), pp. 1028-1032.
O-Ran Alliance, "O-RAN.WG1.O-RAN-Architecture-Description-v07.00", Oct. 2022, Submitted V 8.0. Best Available Date: 2023.
Peesapati, "Energy Efficiency of 5G Radio Access Networks", Master Thesis, KTH Royal Institute of Technology, Sweden, Stockholm, Date: Nov. 9, 2020.
Hossain, et al., "Energy saving game for massive MIMO: Coping with daily load variation," IEEE Transactions on Vehicular Technology 67, No. 3, pp. 2301-2313, 2017, Best Available Date: Dec. 7, 2015.
Notification Concerning Transmittal of International Preliminary Report on Patentability mailed Jan. 22, 2026 for PCT Application No. PCT/US2023/036209, 9 pages.
European Office Action mailed Feb. 19, 2026 for European Patent Application No. 23813508.1, 3 pages.

* cited by examiner

CROSS-LAYER ENERGY EFFICIENT RADIO ACCESS NETWORK POWER CONTROL

BACKGROUND

In wireless network environments, massive multiple-input multiple-output (mMIMO) enables a significant capacity increase, in which capacity is a factor of the wireless network environment and is associated with each user's specified quality of service (QoS). While the proper selection of paired user groups increases the capacity, an increased number of paired users may increase inter-user interference and/or cause other issues, which reduces the user quality and can thereby significantly degrade a customer experience.

One significant issue in massive MIMO is the allocation of power in order to achieve a specific objective, e.g., providing guaranteed QoS to all users while maximizing the throughput. For example, an objective such as the maximization of the network sum-rate over consumed power, subject to a per-user minimum-SINR (signal-to-noise-plus-interference ratio) requirement, is an (NP)-hard problem. Solving such a problem would need to be done in a timely manner, because the state of the channels evolves in time, and the power allocation has to adjust for such state changes. Current methods cannot guarantee that power allocation will take place within such time constraints, in part because any optimization via these methods is centralized at the local edge, which has limited computational capacity.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
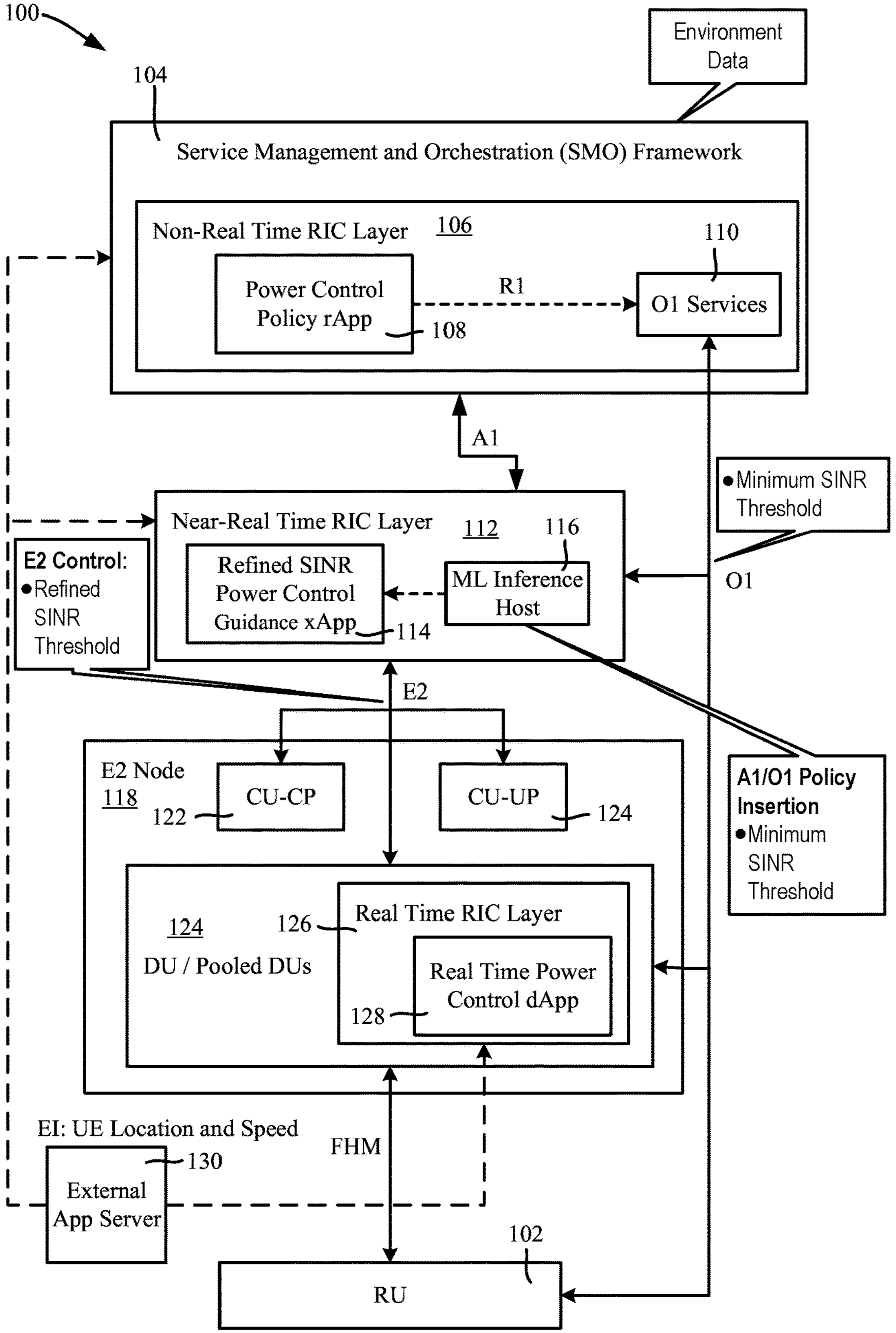
FIG. 1 is an example block diagram representation of a system/architecture that incorporates a distributed cross-layer power control engine, in accordance with various aspects and implementations of the subject disclosure.

Various aspects of the technology described herein are generally directed towards a cross-layer power control engine distributed across radio access network (RAN) layers generally based on the characteristics (e.g., delay data) of each part of the engine. In general, the distributed power control engine operates to optimize spectral efficiency and energy efficiency with guaranteed quality of service (QoS) for UEs based on various data, which can include operator policy, environment changes, and network status, given dynamic changes of specified signal-to-noise-plus-interference ratio (SINR).

In one particular implementation, the distributed power control engine is implemented via artificial intelligence/machine learning (AI/ML)-based applications that are run within distributed controllers, including in the non-real time RAN intelligent controller (RIC) layer, the near-real time RAN intelligent controller layer, and a real time intelligent controller layer. The distribution of the power control applications/procedures is generally based on the latency budget and functionality of each procedure, in a cross-layer intelligent power control engine framework that includes the data/control exchange between the distributed controllers.

In this framework, a policy power control (rApp in the non-real time RIC layer) determines a minimum required SINR policy per UE or group of UEs (e.g., slice), and time granularity of policy updates. The rApp sends the policy to a refined SINR power control guidance xApp (in the near-real time RIC layer) and a real time power adjustment dApp (in a real time RIC layer) over the O1 interface. The xApp uses delay sensitive measurement data and the geolocation and speed of the UEs in both single user MIMO (SU-MIMO) and multi-user MIMO (MU-MIMO) to assess the recommended rApp-provided SINR threshold, and adjust the SINR configuration to provide an environment-aware refined SINR threshold for the dApp. The dApp determines the real time power allocation coefficients per UE per access point using channel coefficients/parameters and/or enrichment information; the dApp, deployed in the real time RIC layer, can have the model inference occur in the O-DU (Open-distributed unit) scheduler.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. For example, "optimal" can mean the highest performing entity of what is available (e.g., the top-rated beam of some limited set of available beams), rather than necessarily achieving a fully optimal result. Similarly, "maximize" means moving towards a maximal state (e.g., up to some threshold limit, if any), rather than necessarily achieving such a state.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system/architecture of a distributed cross-layer power control engine 100 coupled to a radio unit (RU) 102. In the distributed engine 100, different distributed applications play significant roles in power control as described herein. Note that the distributed engine 100 as described herein operates in contrast to legacy RAN systems in which power control is centralized at a distributed unit.

In the example system/architecture that includes the distributed engine 100, a service management and orchestration framework 104 includes a non-real time RIC layer 106 configured to run cloud-based applications (referred to as rApps in O-RAN), including a power control policy rApp 108 as described herein. The power control policy rApp 108 determines a minimum required SINR policy per UE or group of UEs (e.g., slice), and time granularity of policy update. These policy data can be learned such that the power control policy rApp 108 can guarantee quality of service per UE or class of UEs using the prediction data of required SINR per slice. The power control policy rApp 108 is coupled to O1 services 110 via an R1 interface; in turn the O1 services 110 are coupled via the O1 interface to the other distributed engine's layers to communicate various data, including the policy data to both a power control xApp 114 and power control dApp 128 over the O1 interface as described herein.

A near-real time RIC layer 112 is coupled via the AI interface to the non-real time RIC layer 106. The near-real time RIC layer 112 is configured to run edge-based applications, (e.g., xApps (eXtended apps) in O-RAN, including the refined SINR power control xApp 114 as described herein based on the power control minimum required SINR policy data from the power control policy rApp 108. An ML inference host 116 is coupled to or incorporated into the refined SINR power control xApp 114 to assess, based on delay-sensitive measurement data and the geolocation and speed of the UEs in single user MIMO (SU-MIMO) and/or multi-user MIMO (MU-MIMO), the recommended rApp-provided SINR threshold, and adjust the SINR configuration to provide the environment-aware refined SINR threshold. The environment-aware refined SINR threshold is sent to the dApp 128 over the E2 interface.

As shown in FIG. 1, in general an E2 node 118, coupled to the near real time RIC layer via the E2 interface, includes a centralized unit (control plane) CU-CP 120 and centralized unit (user plane) CU-UP 122 components. The E2 node also includes a distributed unit (or a pool of distributed units) 124, which includes the real time RIC layer 126 of the distributed power control engine. The real time RIC layer 126 runs the dApp 128, which determines the real time power allocation coefficients per UE per access point using channel coefficients/parameters and/or enrichment information. This application's inference is on the O-DU scheduler.

Also shown in FIG. 1 is an external application server 130. The external application server 130 participates in various data collection, particularly enrichment information (user equipment trajectory data such as location data/speed data/orientation data) as described herein with reference to FIGS. 4 and 5.

As seen in FIG. 1, the architecture including the distributed power control engine 100 of FIG. 1 can be deployed in a straightforward manner, generally via the cloud/edge applications (rApp, xApp), and can be implemented using existing RIC platforms (both non-real time and near real-time) and interfaces to determine power control specific E2-service model-radio control. Furthermore, the local edge-based application (dApp 128) can substitute for the existing power control application on the scheduler (i.e., O-DU). The dApp 128 can be deployed on a real time RIC 126 with the standardized interfaces working with O-CU/O-DU and in coordination with the non-real time and near-real time RIC platforms. With the power control dApp 128 deployed on a real-time RIC 126 as a substitute for the scheduler power control function, one instantiation of the application can be used for pooled DU scenarios in certain cases.

Turning to further details of the power control policy rApp 108, in the non-real time layer the application 108 facilitates improving the downlink post-pairing SINR for MU-MIMO UE and the SINR for cell edge SU-MIMO UE. Optimization is based on both cell edge performance and overall cell throughput. The output is the minimum downlink SINR threshold provided to the refined SINR threshold guidance xApp 114 and the real time PC dApp 128 (e.g., the L2 scheduler). In some cases, the xApp 114 can be bypassed such that the optimization happens across the rApp 108 and the dApp 128 (which is a reason why the policy based SINR threshold is directly provided to the xApp 114 and the dApp 128).

The rApp 108 uses the O1 interface to collect measurement data over the R1 interface for training the ML model as generally described with reference to FIG. 3. The rApp 108 uses the collected measurement data to optimize the minimum downlink SINR threshold at the O-CU (Open-centralized unit) and/or O-DU (Open distributed unit) and/or O-DU over the O1 interface.

For the MU-MIMO case, the ML model utilizes UE orthogonality and path loss delta data in addition to monitoring SINR data from the downlink channel quality indicator (CQI) measurement. This is to include scenarios in which a group of paired UEs on the cell edge have poor SINR.

Figure 2:
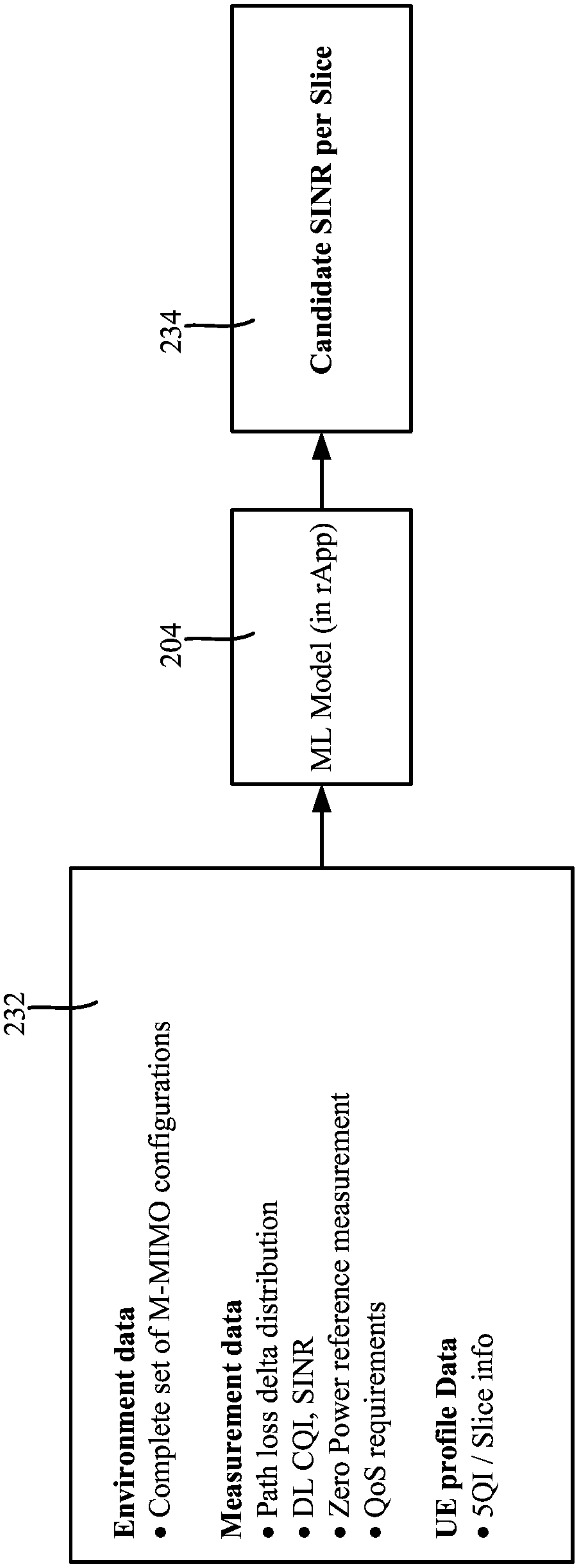
FIG. 2 shows an example machine learning model structure including input data and output data for power control policy with respect to an application (e.g., rApp) at a non-real time radio access network (RAN) intelligent controller (RIC) layer of the distributed power control engine, in accordance with various aspects and implementations of the subject disclosure.

FIG. 2 shows an example of input data 232 to and output data 234 from the power control policy rApp's AI/ML model instance 204. In this example, the (non-limiting) input parameters 232 can include environment data, including, but not limited to a complete set of MMIMO (massive multiple-input, multiple-out) configurations. Digital twin information can also be input as environment data. Additional input includes measurement data, which can include, but is not limited to path loss delta distribution data, downlink CQI data, SINR data, zero power reference measurement data and QoS requirements. UE profile data including but not limited to 5G QoS identifier (5QI) per slice information can also be input to the model. Other non-limiting input data can include operator policy data, e.g., a constrained utility function.

The example, non-limiting output policy data 234 can include the candidate SINR data per slice, e.g., the minimum required SINR policy per UE or group of UEs. The refined SINR power control xApp 114 (FIG. 1) obtains and assesses the output candidate SINR data per slice 234 as described herein.

Figure 3:
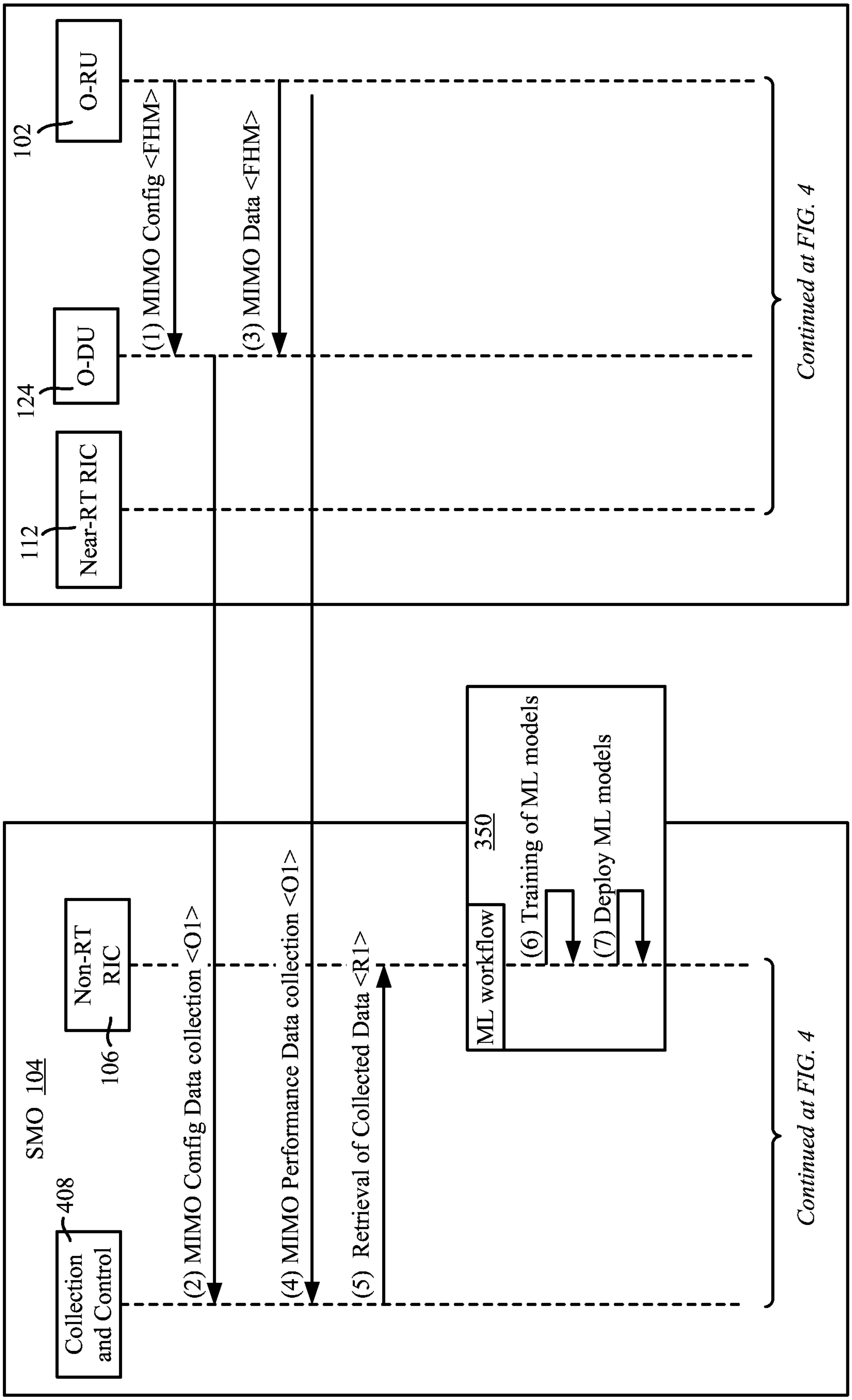
FIGS. 3 and 4 comprise an example sequence and dataflow diagram for the power control policy application (e.g., rApp) running at the non-real time RIC layer, in accordance with various aspects and implementations of the subject disclosure.

FIG. 3 shows a dataflow/sequence/call flow diagram for the power control policy rApp 108 (FIG. 1). As can be seen in FIG. 3, at arrow one (1) the distributed unit (O-DU) 124 obtains MIMO configuration data from the radio unit (O-RU) 102 via a fronthaul multiplexing <FHM> interface. In turn, at arrow two (2) the distributed unit 124 provides the collected MIMO configuration data to a collection and control component 408 of the SMO 104, e.g., coupled to (or incorporated into) the non-real time (RT) RIC 106. At arrow three (3) the distributed unit (O-DU) 124 obtains MIMO data from the radio unit (O-RU) 102 via the fronthaul multiplexing <FHM> interface, and at arrow four (4) the distributed unit 124 provides the collected MIMO configuration data to the collection and control component 408 of the SMO 104.

Retrieval of the collected data (arrow five (5)) by the non-real time (RT) RIC 104 can be done over the R1 interface from O1 services 110 (FIG. 1). The ML model(s) training and deployment are represented via arrows six (6) and seven (7) in the ML workflow block 350, respectively. The dataflow/sequence/call flow diagram continues at FIG. 4.

Figure 4:
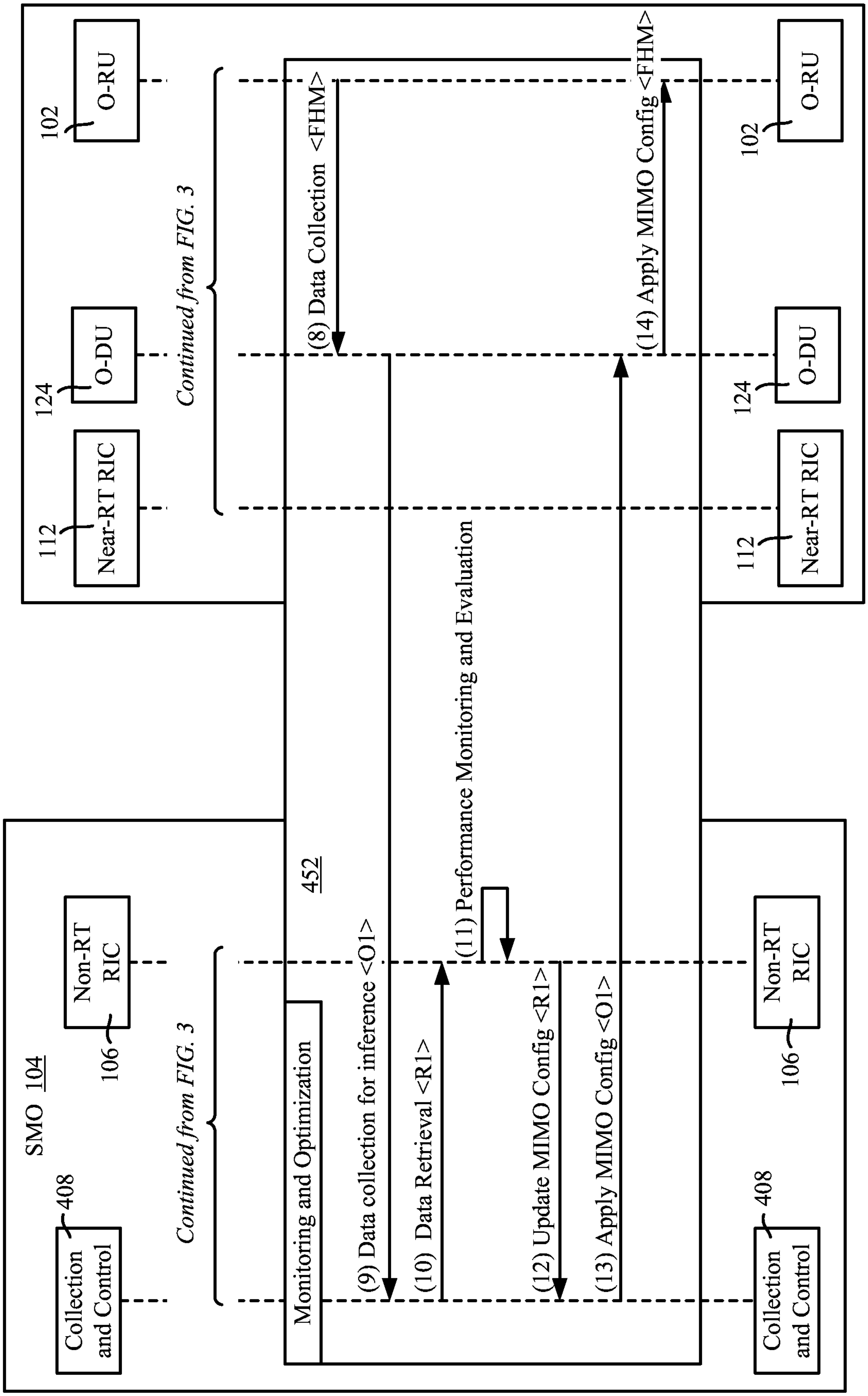

Once trained, as shown in the monitoring and optimization block 452 of FIG. 4, inference is performed on current data, obtained via arrow eight (8) from the radio unit (O-RU) 102 to the distributed unit (O-DU) 124 and from the distributed unit (O-DU) 124 via arrow nine (9) to the collection and control component 408. Retrieval of the data collected for inference (arrow ten (10)) by the non-real time (RT) RIC 104 is used for performance monitoring and evaluation (arrow eleven (11)).

Based on the data, the MIMO configuration data can be updated via the R1 interface and applied (via the O1 interface) to the distributed unit (O-DU) 124 of the real time RIC layer 126 (FIG. 1), as represented in FIG. 4 via arrows twelve (12) and thirteen (13), respectively. The MIMO configuration data is applied to the radio unit (O-RU) 102 as represented by the arrow fourteen (14).

To summarize, the rApp 108 collects the current MIMO configuration data as well as MIMO data (measurement data and network key performance indicators (KPIs)). The rApp 108 uses the measurement data to evaluate the capacity and UE performance, and generate a recommendation to power control xApp 114 and/or dApp 128 to change the SINR configuration.

Turning to additional details of the refined SINR power control guidance xApp 114, this application generally performs a feasibility assessment of the provided SINR configuration recommendation (candidate data) from the power control policy rApp 108. The xApp 114 uses delay sensitive measurement data, and the geolocation and speed of the UEs in both SU-MIMO and MU-MIMO, to assess the recommended rApp-provided SINR threshold, and adjust the SINR configuration to provide an environment-aware refined SINR threshold.

To predict the environment more precisely and provide more accurate feasible SINR data to the real time power control dApp 128, one or more recurrent neural network (RNN) models, e.g., long short-term memory (LSTM) can be used to train the ML model using the history of allocated powers and UEs' trajectory data, in addition to UE measurement data (e.g., downlink channel quality indicator (CQI) report histogram data, intercell interference measurements, channel state information-SINR (CSI-SINR), paired UE orthogonality factor data in the case of MU-MIMO, and path loss delta distribution data.

Figure 5:
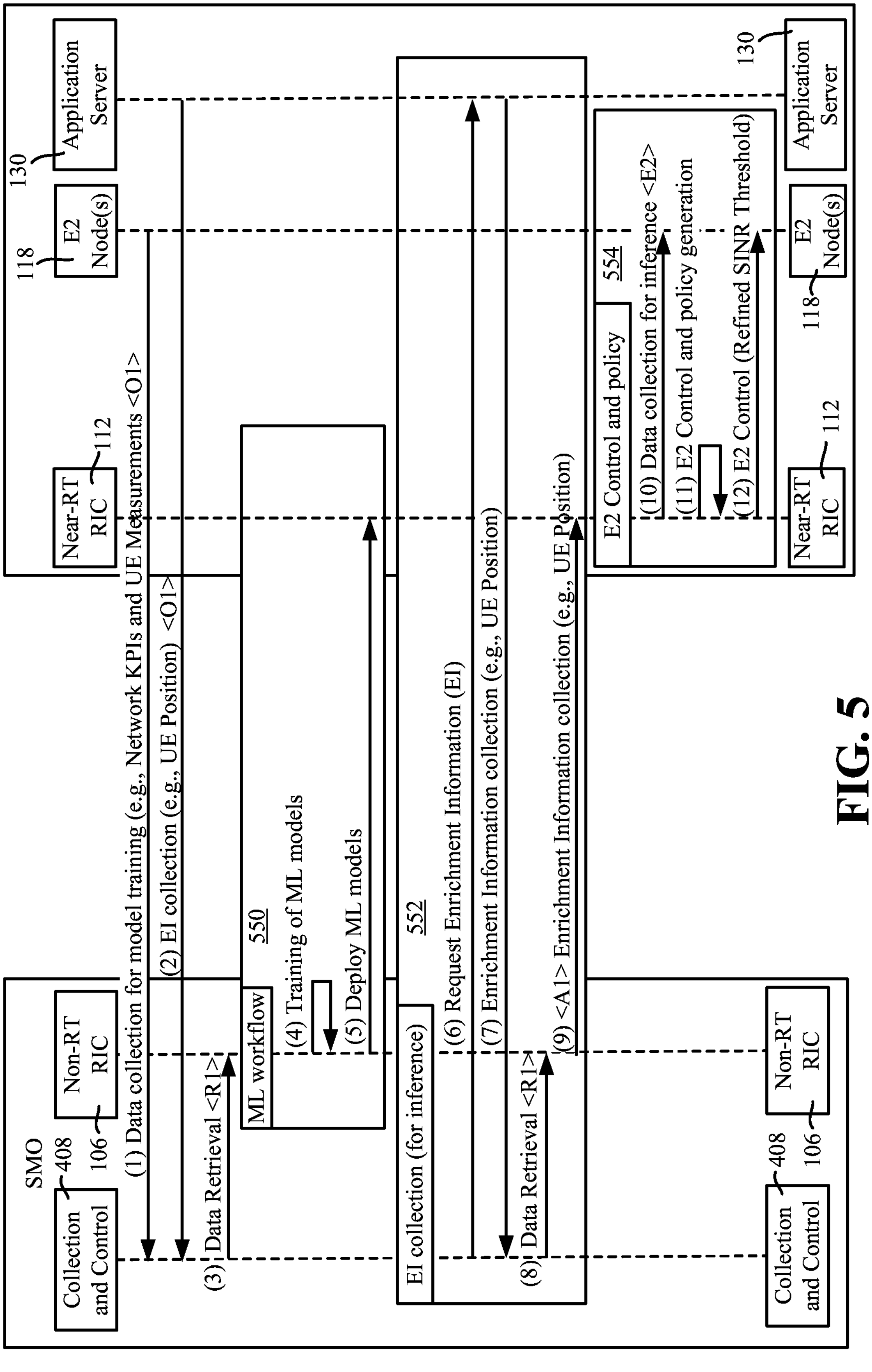
FIG. 5 is an example sequence and dataflow diagram for a refined signal-to-noise-plus-interference ratio power control guidance application (e.g., xApp) running at the near-real time RIC layer, in accordance with various aspects and implementations of the subject disclosure.

FIG. 5 shows a dataflow/sequence/call flow diagram for the power control set selection xApp 114 (FIG. 1). As can be seen in FIG. 5, at arrow one (1) the collection and control component 408 of the SMO 104 (coupled to or incorporated into the non-real time (RT) RIC 106) collects the model training data from the E2 node(s) 118. At arrow two (2), enrichment information (e.g., UE position, speed, orientation data) is collected from the application server 130. Retrieval of the collected data and enrichment information (arrow three (3)) can be done over the R1 interface from O1 services 110 (FIG. 1) and/or from the application server 130. In this example, ML model(s) training and deployment are represented via arrows four (4) and five (5) in the ML workflow block 550, respectively; note that this is only one example implementation.

In this example, once trained, as shown in the EI collection for inference block 552 of FIG. 5, enrichment information is collected for inference (block 552), obtained via a request represented by arrow six (6) to the application server 130, and a response from the application server 130 represented by via arrow seven (7). The rApp 108 in the non-real time RIC 106 retrieves (arrow eight (8)) the enrichment information, which is then sent to/collected by the xApp 114 (arrow nine (9)) in the near-real time RIC 112.

As shown in the E2 control and policy block 554, data collection for inference is sent from the near-real time RIC 112 to the E2 node(s) 118, as represented by arrow ten (10).

The xApp 114 uses the collected inference data for generating control and policy data, as generally represented by arrow eleven (11). The E2 control data including the refined SINR data is provided to the E2 node(s) 118, that is, to the real time power control dApp 128 via the E2 interface (arrow twelve (12)).

The real time power control dApp 128 provides real time power allocation based on the refined maximum feasible SINR per UE provided by the xApp 114, with less complexity (relative to other solutions) because SINR feasibility has been offloaded the xApp 114, (which can provide a closed-form solution based on the predicted maximum feasible SINR per UE). The real time power control dApp 128 can be a substitution for the DU's scheduler level power control.

One benefit of using the dApp 128 instead of scheduler-level power control is in the case of DU-pooling. In this case, one instantiation of the dApp 128 can be sufficient for a pool of DUs. Besides the beneficial architecture of the dApp, the AI/ML-based power control solution can improve the overall cell throughput and cell edge performance (UE quality of service) due to predictability of a feasible SINR per UE.

Figure 6:
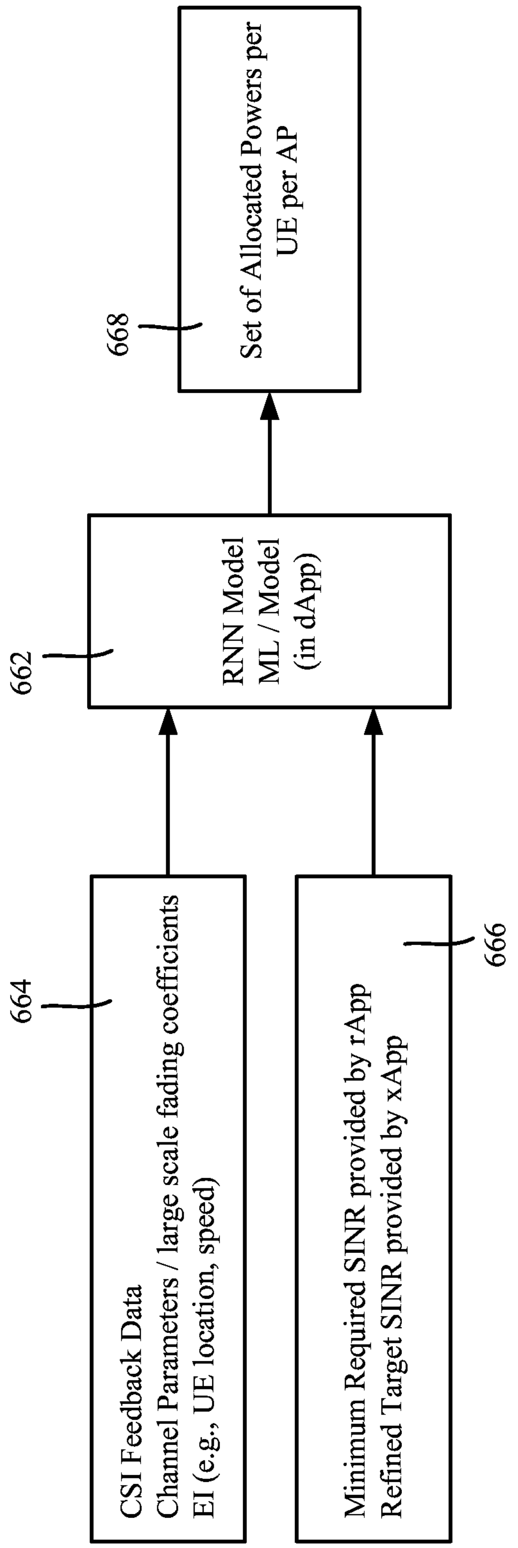
FIG. 6 shows an example machine learning model structure including input data and output data for power control allocation with respect to an application (e.g., dApp) at a real time RIC layer of the distributed power control engine, in accordance with various aspects and implementations of the subject disclosure.

As can be understood, the use of enrichment information (e.g., UE location and speed) can simplify the power optimization problem in the case that the full channel information is not available, and/or to predict the power allocation ahead of time using history data of allocated power to the UEs with their corresponding location and speed data. One non-limiting set of inputs and outputs to the ML model 662 deployed on the RT RIC 126 (or O-DU 124) is shown in FIG. 6.

As shown via blocks 664 and 666, non-limiting input data can include CSI feedback data, channel parameters/large scale fading coefficients data and enrichment information E1 (e.g., UE location, speed, and possibly orientation). The other (non-limiting) input data (block 666) can include the minimum required SINR provided by the rApp 104, and the refined target SINR data provided by the xApp 114. The output 668 is the set of allocated power data per UE per access point (AP).

By way of example, described is a problem formulation for real time power allocation with a constraint on the UE's quality of service, with different methodologies to solve the optimization problem. In one real time power control dApp optimization solution, consider a mMIMO system with K UEs and L access points; (in a centralized learning scheme, the optimization happens across all access points). The input data to the ML model can include channel large scale coefficients $\{\beta_{kl}: \forall k, l\}$ to provide the baseline performance criteria. However, using assistive parameters (e.g., UE's location and speed) in addition to channel parameters can improve the performance of the ML method.

In this example solution, assume that the allocated power to a specific link is a function of current channel parameters and UE's location. To predict the power allocation coefficients ahead of time, the history of allocated power coefficients, the history of UE trajectories and the history of channel large scale coefficients can be used as input parameters to the ML model. Note that each specific precoder scheme (e.g., maximum ratio (MR) or zero forcing (ZF)) needs a particular trained model for estimating the power allocation coefficients. The power allocation coefficients are the output of an optimization problem which is dependent on the precoding coefficients. Having a precoding-specific trained model tends to result in better performance by capturing the dependency of power coefficients and precoding vector.

To solve constrained energy efficiency, three different ML models are trained to be deployed on non-RT RIC, near-RT RIC and RT RIC (or O-DU scheduler) as described herein. To solve a centralized real time power allocation problem, the candidate refined SINR target is provided to the optimizer (e.g., dApp 128) by the rApp 104/xApp 114 combination, as also described herein.

The distributed learning model operates on a per-access point basis. In other words, the ML model of an access point l receives only the locally-available UEs' parameters (e.g., channel large scale coefficients $\{\beta_{kl}: \forall k\}$ or channel parameters and/or UEs' location and speed) and tries to estimate the local power allocation coefficients $\rho_{kl}$, $\forall k$. The power allocation coefficient $\rho_{kl}$ is the downlink power allocated to UE k by AP l. The optimization is constrained, as each access point has a maximum power $P_{max}$. The power constraint at access point l is $$\sum_{k=1}^{K} \rho_{kl} \leq P_{max}$$

(assuming all access points have similar maximum power).

Large-scale fading coefficients are used as the baseline because they capture the main feature of propagation channels and interference, and can be measured in practice based on the received signal strength. The distributed learning model does not need to exchange the channel coefficients among multiple access points, which results in more scalable network operation and fewer number of trainable parameters per access point. The centralized learning strategy outperforms a distributed learning method in terms of spectral efficiency.

The distributed constrained energy efficiency problem per access point l is expressed as $$\begin{aligned} &\max_{\{\rho_{kl}:\forall k\}} \frac{\sum_{k=1}^{K} \log_2(1+SINR_k)}{\sum_{k=1}^{K} \rho_{kl} + P_l} \\ \text{S.t.}\quad & SINR_k \geq tSINR_k,\ k=1, \ldots, K \\ & \sum_{i=1}^{K} \rho_{kl} \leq P_{max} \end{aligned}.$$

where $tSINR_k$ is the refined or non-refined target SINR of the kth UE provided by the rApp 104/xApp 114 combination or rApp 104 power control policy, and $P_l$ is the power consumed in the circuit of lth access point.

As can be seen in the above equation, the maximization of energy efficiency happens per access point and consequently the energy consumption of each access point is minimized independent of other access points; (which contrasts with a goal of minimization of the sum power of all access points). However, if a sleep strategy configuration is provided by upper layers, active access points are assumed to be determined at each time instance and distributed constrained energy efficiency strategy for sleep-enabled networks can be used per active access points in accordance with the goal of minimizing total energy consumption. Furthermore, a deep reinforcement learning (DRL) framework could be used for a process of distributed constrained energy efficiency when an upper layer sleep mode configuration is not available. In this method, in one step a DRL agent first selects the access points that will be active in the next time slot, and then optimizes the power allocation in a next step.

To summarize, the distributed power control engine 100 described herein provides a practical solution to an energy efficiency sum-spectrum efficiency maximization problem with a given SINR target per UE or class of UEs. The solution can be based on overall cell capacity and individual UE quality of service objectives. In the distributed power control engine 100, the given SINR target is provided to the real time power control dApp 128 by the policy power control rApp 104 and the refined SINR guidance xApp 114. As set forth herein, in some cases the xApp can be bypassed, with the SINR threshold provided to the dApp solely by power control policy rApp.

In addition to different architectural deployments of ML models, the method of solving can vary from supervised to semi-supervised and unsupervised reinforcement learning (RL).

To optimize both spectral efficiency and energy efficiency with the SINR constraint for all UEs based on operator's policy, environment changes, and network status, the distributed power control technology described herein facilitates dynamic changes to the required SINR. To solve an otherwise NP-hard maximization problem, the maximization problem is divided into three sub-problems, namely, the candidate value problem (rApp), the feasibility problem (xApp), and the real time power allocation (dApp) based on the refined feasible SINR data (from the xApp). This provides a near-optimal procedure, with constituent sub-problems distributed to the edge continuum to overcome computational limitations of schedulers.

The distributed power control engine 100 includes the policy power control rApp (providing candidate value per slice), refined SINR power control guidance xApp (to check the feasibility of the candidate SINR and refine it based on channel information per UE), and the real time power adjustment dApp. Based on the functionality and the delay budget of the distributed power control applications, one example implementation maps the distributed power control engine into a joint rApp/xApp/dApp control framework to offload computations to the edge continuum.

Figure 7:
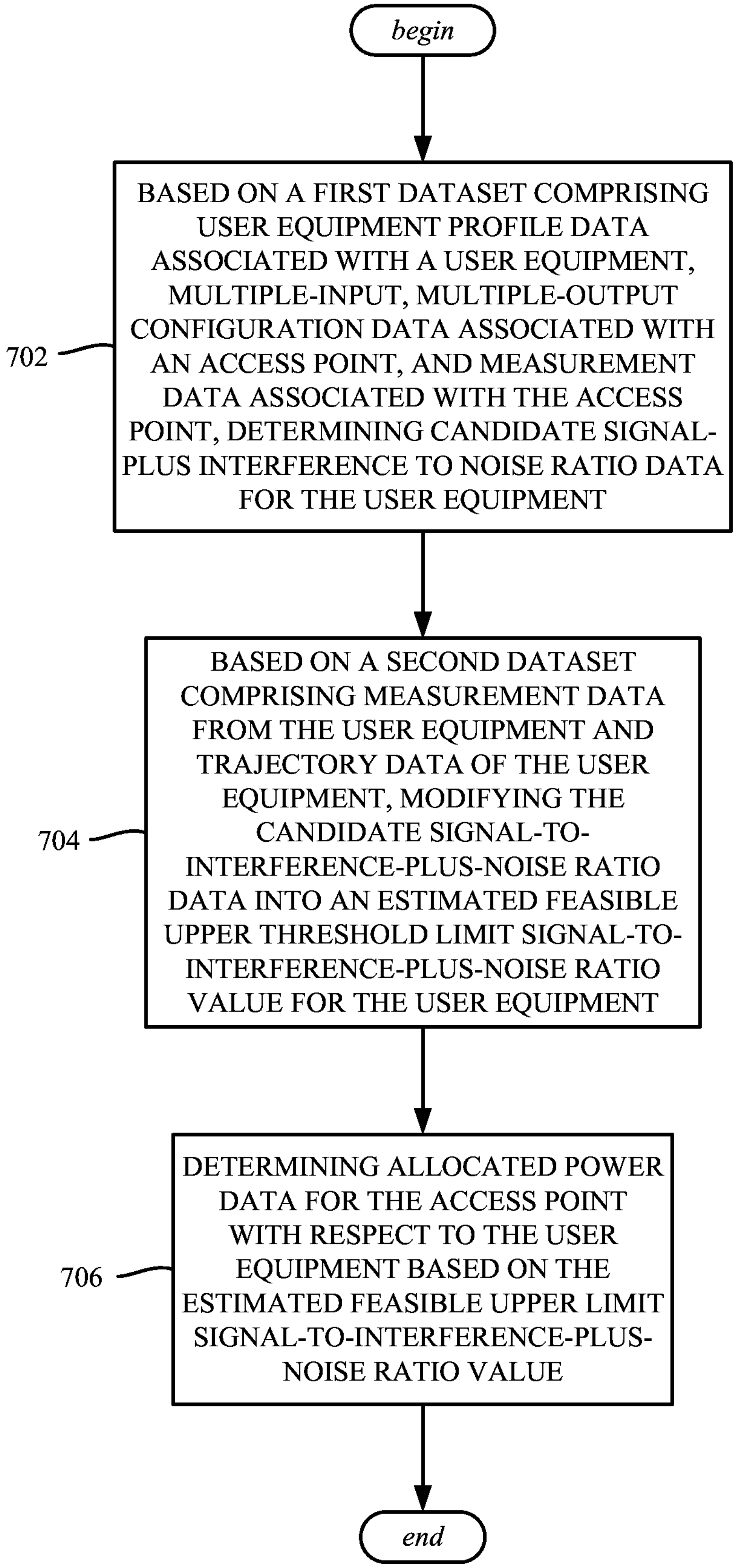
FIG. 7 is a flow diagram showing example operations related to determining allocated power data for an access point with respect to a user equipment based on an estimated feasible upper limit SINR value, in accordance with various aspects and implementations of the subject disclosure.

One or more aspects can be embodied in network equipment, such as represented in the example operations of FIG. 7, and for example can include a memory that stores computer executable components and/or operations, and a processor that executes computer executable components and/or operations stored in the memory. Example operations can include operation 702, which represents, based on a first dataset comprising user equipment profile data associated with a user equipment, multiple-input, multiple-output configuration data associated with an access point, and measurement data associated with the access point, determining candidate signal-plus interference to noise ratio data for the user equipment. Example operation 704 represents based on a second dataset comprising measurement data from the user equipment and trajectory data of the user equipment, modifying the candidate signal-to-interference-plus-noise ratio data into an estimated feasible upper threshold limit signal-to-interference-plus-noise ratio value for the user equipment. Example operation 706 represents determining allocated power data for the access point with respect to the user equipment based on the estimated feasible upper limit signal-to-interference-plus-noise ratio value.

Determining the candidate signal-plus interference to noise ratio data for the user equipment can include determining the candidate signal-plus interference to noise ratio data for a user equipment group comprising the user equipment.

The first dataset further can include at least one of: constraint data representative of a constraint, or digital twin data representative of a digital twin.

The measurement data can include at least one of: path loss data representative of a path loss associated with the access point, channel quality indicator data representative of a channel quality associated with the access point, zero power reference data representative of a zero power reference associated with the access point, or quality of service identifier data representative of a quality of service associated with the access point.

Determining the candidate signal-plus interference to noise ratio data for the user equipment can include inputting the first dataset into a model, the model having been trained with collected prior multiple-input, multiple-output configuration data and collected prior multiple-input, multiple-output performance data, and obtaining, from the trained model in response to the inputting of the dataset, the candidate signal-plus interference to noise ratio data.

The model can be incorporated into non-real time radio access network controller.

Modifying the candidate signal-to-interference-plus-noise ratio data can be further based on at least one of: prior allocated power history data representative of past allocations of power, prior user equipment trajectory history data representative of past trajectories of previously connected user equipment, or prior user equipment measurement data representative of past measurements applicable to the previously connected user equipment.

Modifying the candidate signal-to-interference-plus-noise ratio data trained model can be performed by an application of a near-real time radio access network controller.

Determining the allocated power data can include inputting a third dataset into a trained model, the third dataset including a low threshold signal-to-interference-plus-noise ratio value corresponding to the candidate signal-plus interference to noise ratio data, the estimated feasible upper limit signal-to-interference-plus-noise ratio value, and the trajectory information, the trained model can have been trained with collected prior network performance data representative of past measurements of past network performance, collected prior measurement data representative of past measurements associated with the access point, and collected prior enrichment information comprising collected prior geolocation data representative of past geolocations of previously connected user equipment and speed data representative of past speeds of the previously connected user equipment.

The third dataset further can include at least one of channel state information feedback data representative of a channel state, channel parameter data representative of a channel parameter, or fading coefficient data representative of at least one fading coefficient.

Modifying the candidate signal-to-interference-plus-noise ratio data can be performed by an application of a distributed unit.

Figure 8:
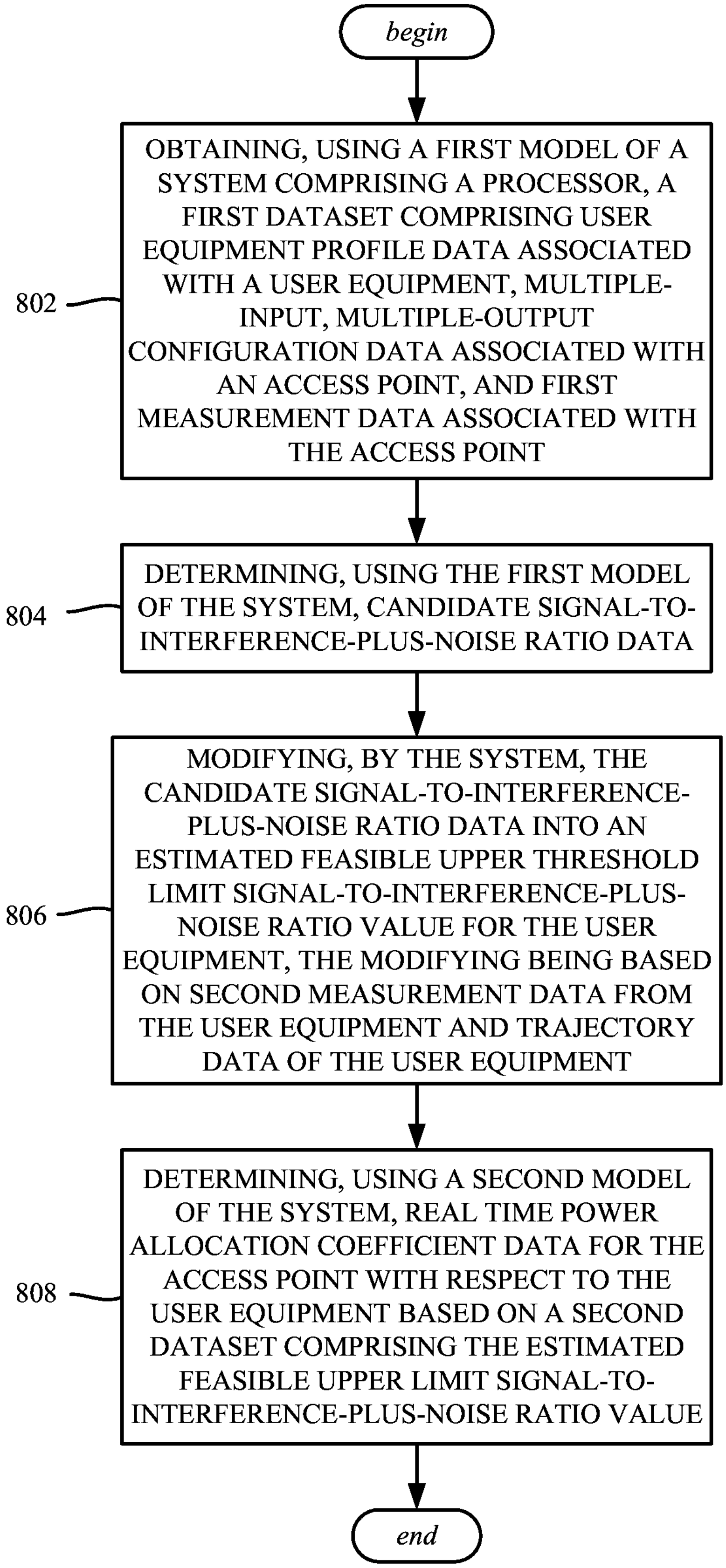
FIG. 8 is a flow diagram showing example operations related to modifying candidate SINR data into an estimated feasible upper threshold limit SINR value for a user equipment for determining real time power allocation coefficient data for the access point with respect to the user equipment, in accordance with various aspects and implementations of the subject disclosure.

One or more example aspects, such as corresponding to example operations of a method, are represented in FIG. 8. Example operation 802 represents obtaining, using a first model of a system comprising a processor, a first dataset comprising user equipment profile data associated with a user equipment, multiple-input, multiple-output configuration data associated with an access point, and first measurement data associated with the access point. Example operation 804 represents determining, using the first model of the system, candidate signal-to-interference-plus-noise ratio data. Example operation 806 represents modifying, by the system, the candidate signal-to-interference-plus-noise ratio data into an estimated feasible upper threshold limit signal-to-interference-plus-noise ratio value for the user equipment, the modifying being based on second measurement data from the user equipment and trajectory data of the user equipment. Example operation 808 represents determining, using a second model of the system, real time power allocation coefficient data for the access point with respect to the user equipment based on a second dataset comprising the estimated feasible upper limit signal-to-interference-plus-noise ratio value.

The first model can be incorporated into a non-real time radio access network intelligent controller, and determining the candidate signal-to-interference-plus-noise ratio data can include inputting the first dataset to the first model.

The first model can be coupled to a near-real time radio access network intelligent controller, and further operations can include communicating, by the system, the candidate signal-to-interference-plus-noise ratio data to the near-real time radio access network intelligent controller modifying the candidate signal-to-interference-plus-noise ratio data into the estimated feasible upper threshold limit signal-to-interference-plus-noise ratio value can be performed by an application of the near-real time radio access network intelligent controller.

The near-real time radio access network intelligent controller can be coupled to a distributed unit comprising the second model, and further operations can include communicating, by the system, the estimated feasible upper threshold limit signal-to-interference-plus-noise ratio value from the near-real time radio access network intelligent controller to the distributed unit.

Figure 9:
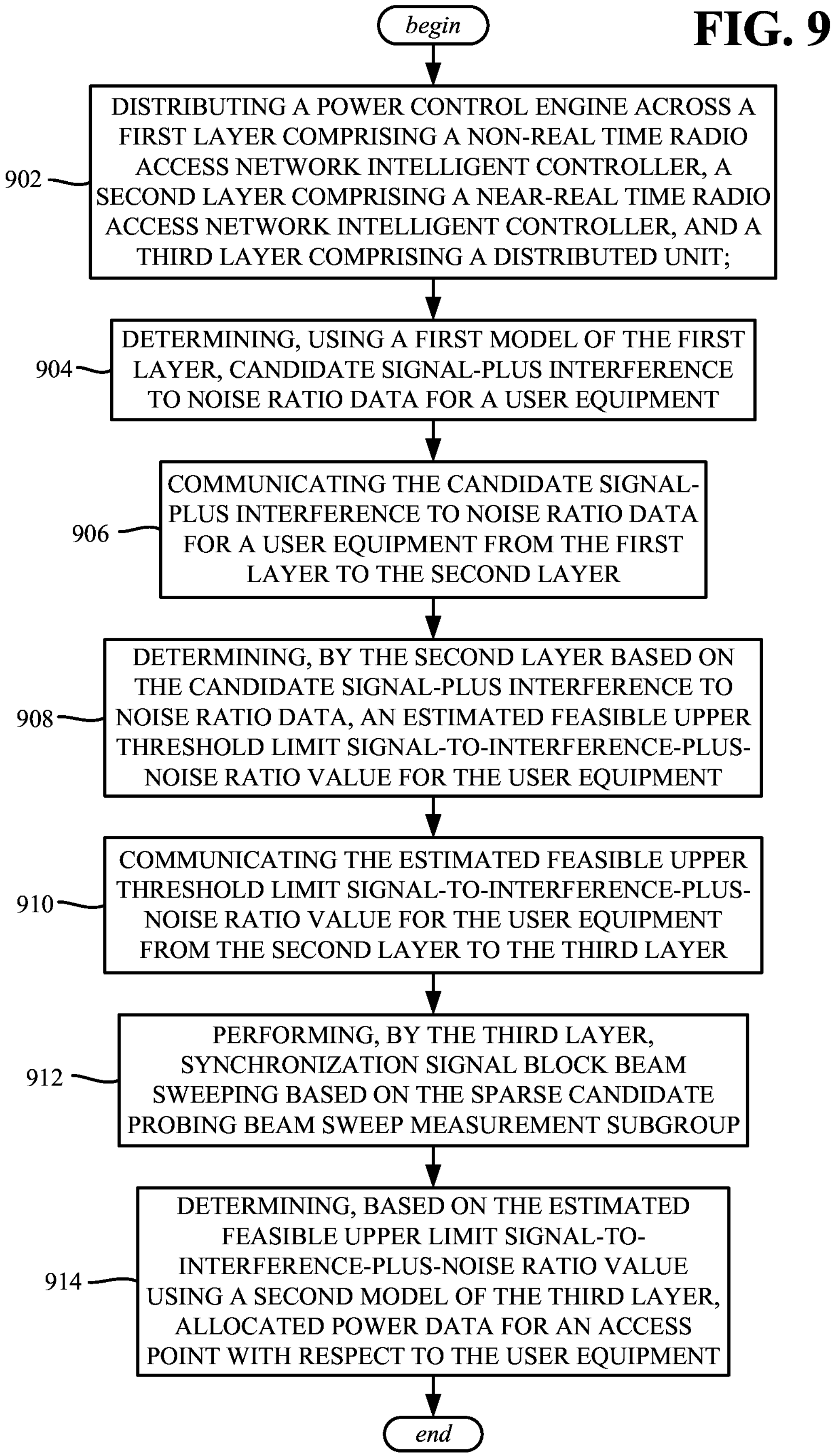
FIG. 9 is a flow diagram showing example operations related to distributing a power control engine across radio access network layers for determining, based on SINR data, allocated power data for an access point with respect to a user equipment, in accordance with various aspects and implementations of the subject disclosure.

FIG. 9 summarizes various example operations, e.g., corresponding to a machine-readable medium, comprising executable instructions that, when executed by a processor, facilitate performance of operations. Example operation 902 represents distributing a power control engine across a first layer comprising a non-real time radio access network intelligent controller, a second layer comprising a near-real time radio access network intelligent controller, and a third layer comprising a distributed unit. Example operation 904 represents determining, using a first model of the first layer, candidate signal-plus interference to noise ratio data for a user equipment. Example operation 906 represents communicating the candidate signal-plus interference to noise ratio data for a user equipment from the first layer to the second layer. Example operation 908 represents determining, by the second layer based on the candidate signal-plus interference to noise ratio data, an estimated feasible upper threshold limit signal-to-interference-plus-noise ratio value for the user equipment. Example operation 910 represents communicating the estimated feasible upper threshold limit signal-to-interference-plus-noise ratio value for the user equipment from the second layer to the third layer. Example operation 912 represents performing, by the third layer, synchronization signal block beam sweeping based on the sparse candidate probing beam sweep measurement subgroup. Example operation 914 represents determining, based on the estimated feasible upper limit signal-to-interference-plus-noise ratio value using a second model of the third layer, allocated power data for an access point with respect to the user equipment.

Further operations can include communicating the candidate signal-plus interference to noise ratio data from the first layer to the third layer.

Determining the candidate signal-plus interference to noise ratio data for a user equipment can include inputting user equipment profile data associated with the user equipment, multiple-input, multiple-output configuration data associated with an access point, and measurement data associated with the access point to the first model.

Determining the estimated feasible upper threshold limit signal-to-interference-plus-noise ratio value for the user equipment can include inputting trajectory data of the user equipment into a third model running as an application on the near-real time radio access network intelligent controller.

Determining the allocated power data can include inputting, to the second model, location and speed data of the user equipment, and inputting, to the second model, a low threshold signal-to-interference-plus-noise ratio value corresponding to the candidate signal-plus interference to noise ratio data.

As can be seen, the technology described herein facilitates a distributed cross layer power control engine that provides significant flexibility in providing centralized and decentralized power control optimization choices. The distributed engine allows dividing a constrained optimization problem among multiple stages/layers to maximize the cell overall throughput and UE quality of service, while efficiently reducing energy consumption of the network. For the real time power control application, described herein is a feasible and practical ML-based solution to solve constrained energy efficiency sum-spectral efficiency maximization problem based on a target SINR provided through upper layers of the distributed power control engine. There can be centralized or distributed approaches depending on the colocation of baseband and radio units and/or their disaggregation.

Figure 10:
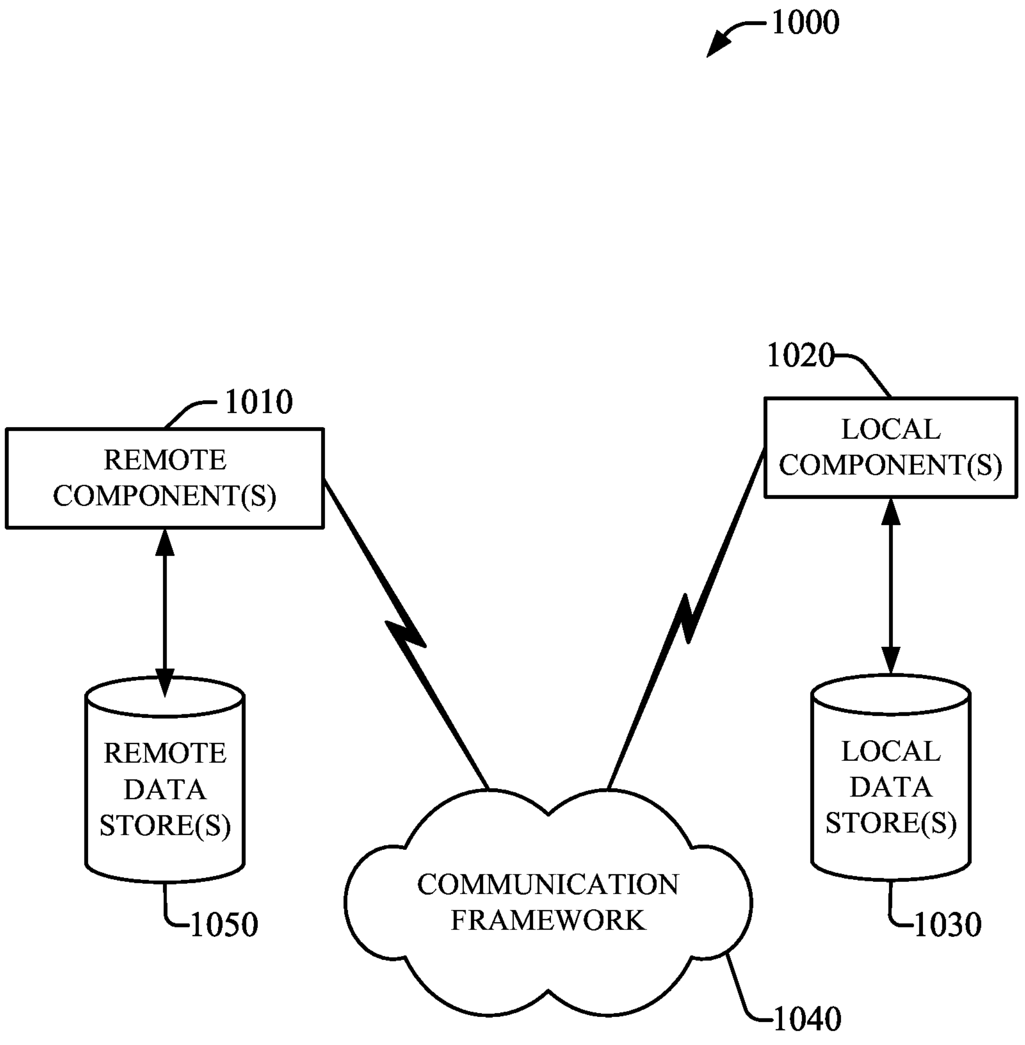
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
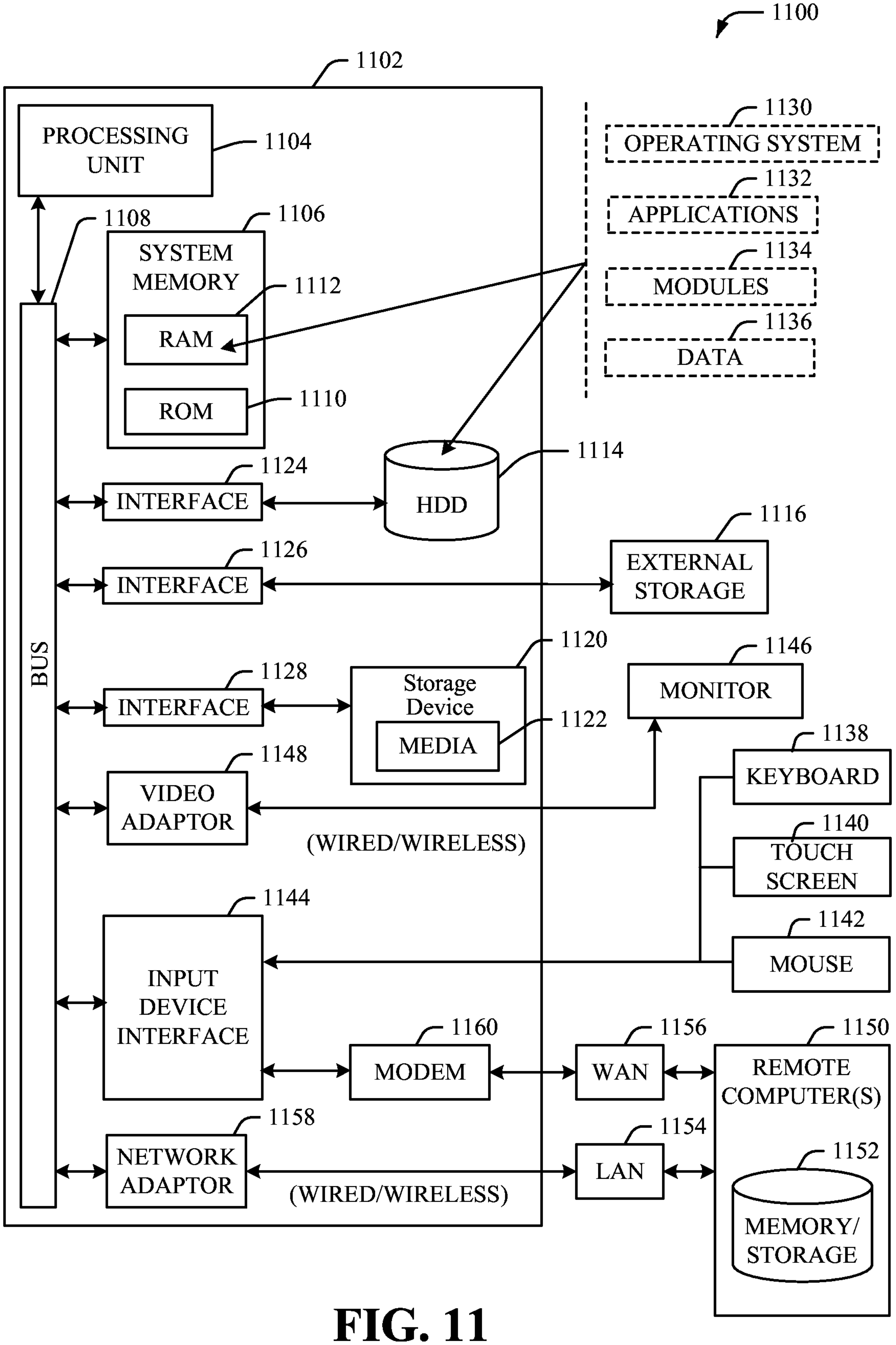
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. At least one network computing equipment component, comprising:

at least one processor; and at least one memory component that stores executable instructions that, when executed by the at least one processor, facilitate performance of operations, the operations comprising:

based on a first dataset comprising user equipment profile data associated with a user equipment, multiple-input, multiple-output configuration data associated with an access point, and measurement data associated with the access point, determining candidate signal-to-interference-plus-noise ratio data for the user equipment;

based on a second dataset comprising measurement data from the user equipment and trajectory data of the user equipment, modifying the candidate signal-to-interference-plus-noise ratio data into an estimated feasible upper limit signal-to-interference-plus-noise ratio value for the user equipment; and determining allocated power data for the access point with respect to the user equipment based on the estimated feasible upper limit signal-to-interference-plus-noise ratio value, wherein the determining of the candidate signal-to-interference-plus-noise ratio data for the user equipment comprises inputting the first dataset into a model, the model having been trained with collected prior multiple-input, multiple-output configuration data and collected prior multiple-input, multiple-output performance data, and obtaining, from the trained model in response to the inputting of the first dataset, the candidate signal-to-interference-noise ratio data.

2. The network equipment of claim 1, wherein the determining of the candidate signal-to-interference-plus-noise ratio data for the user equipment comprises determining the candidate signal-to-interference-plus-noise ratio data for a user equipment group comprising the user equipment.

3. The network equipment of claim 1, wherein the first dataset further comprises at least one of: constraint data representative of a constraint, or digital twin data representative of a digital twin.

4. The network equipment of claim 1, wherein the measurement data comprises at least one of: path loss data representative of a path loss associated with the access point, channel quality indicator data representative of a channel quality associated with the access point, zero power reference data representative of a zero power reference associated with the access point, or quality of service identifier data representative of a quality of service associated with the access point.

5. The network equipment of claim 1, wherein the model is incorporated into non-real time radio access network controller.

6. The network equipment of claim 1, wherein the modifying of the candidate signal-to-interference-plus-noise ratio data is further based on at least one of: prior allocated power history data representative of past allocations of power, prior user equipment trajectory history data representative of past trajectories of previously connected user equipment, or prior user equipment measurement data representative of past measurements applicable to the previously connected user equipment.

7. The network equipment of claim 1, wherein the modifying of the candidate signal-to-interference-plus-noise ratio data trained model is performed by an application of a near-real time radio access network controller.

8. The network equipment of claim 1, wherein the determining of the allocated power data comprises inputting a third dataset into a trained model, the third dataset comprising a low threshold signal-to-interference-plus-noise ratio value corresponding to the candidate signal-plus interference to noise ratio data, the estimated feasible upper limit signal-to-interference-plus-noise ratio value, and the trajectory information, the trained model having been trained with collected prior network performance data representative of past measurements of past network performance, collected prior measurement data representative of past measurements associated with the access point, and collected prior enrichment information comprising collected prior geolocation data representative of past geolocations of previously connected user equipment and speed data representative of past speeds of the previously connected user equipment.

9. The network equipment of claim 8, wherein the third dataset further comprises at least one of channel state information feedback data representative of a channel state, channel parameter data representative of a channel parameter, or fading coefficient data representative of at least one fading coefficient.

10. The network equipment of claim 1, wherein the modifying of the candidate signal-to-interference-plus-noise ratio data is performed by an application of a distributed unit.

11. A method, comprising:

obtaining, using a first model of a system comprising a processor, a first dataset comprising user equipment profile data associated with a user equipment, multiple-input, multiple-output configuration data associated with an access point, and first measurement data associated with the access point;

determining, using the first model of the system, candidate signal-to-interference-plus-noise ratio data;

modifying, by the system, the candidate signal-to-interference-plus-noise ratio data into an estimated feasible upper limit signal-to-interference-plus-noise ratio value for the user equipment, the modifying being based on second measurement data from the user equipment and trajectory data of the user equipment; and determining, using a second model of the system, real time power allocation coefficient data for the access point with respect to the user equipment based on a second dataset comprising the estimated feasible upper limit signal-to-interference-plus-noise ratio value, wherein the candidate signal-to-interference-plus-noise ratio corresponds to the user equipment, and wherein the determining of the candidate signal-to-interference-plus-noise ratio data comprises inputting the first dataset into the first model, the first model having been trained with collected prior multiple-input, multiple-output configuration data and collected prior multiple-input, multiple-output performance data, and obtaining, from the first model in response to the inputting of the dataset, the candidate signal-to-interference-noise ratio data.

12. The method of claim 11, wherein the first model is incorporated into a non-real time radio access network intelligent controller, and wherein the determining of the candidate signal-to-interference-plus-noise ratio data comprises inputting the first dataset to the first model.

13. The method of claim 12, wherein the first model is coupled to a near-real time radio access network intelligent controller, and further comprising communicating, by the system, the candidate signal-to-interference-plus-noise ratio data to the near-real time radio access network intelligent controller, wherein the modifying of the candidate signal-to-interference-plus-noise ratio data into the estimated feasible upper limit signal-to-interference-plus-noise ratio value is performed by an application of the near-real time radio access network intelligent controller.

14. The method of claim 13, wherein the near-real time radio access network intelligent controller is coupled to a distributed unit comprising the second model, and further comprising communicating, by the system, the estimated feasible upper limit signal-to-interference-plus-noise ratio value from the near-real time radio access network intelligent controller to the distributed unit.

15. A non-transitory machine-readable medium, comprising executable instructions that, when executed by a processor, facilitate performance of operations, the operations comprising:

distributing a power control engine across a first layer comprising a non-real time radio access network intelligent controller, a second layer comprising a near-real time radio access network intelligent controller, and a third layer comprising a distributed unit;

determining, using a first model of the first layer, candidate signal-to-interference-plus-noise-ratio data for a user equipment;

communicating the candidate signal-to-interference-plus-noise-ratio data for a user equipment from the first layer to the second layer;

determining, by the second layer based on the candidate signal-to-interference-plus-noise-ratio data, an estimated feasible upper limit signal-to-interference-plus-noise ratio value for the user equipment;

communicating the estimated feasible upper limit signal-to-interference-plus-noise ratio value for the user equipment from the second layer to the third layer;

performing, by the third layer, synchronization signal block beam sweeping based on the sparse candidate probing beam sweep measurement subgroup; and determining, based on the estimated feasible upper limit signal-to-interference-plus-noise ratio value using a second model of the third layer, allocated power data for an access point with respect to the user equipment, wherein the determining of the candidate signal-to-interference-plus-noise ratio data comprises inputting first dataset data comprising user equipment profile data associated with the user equipment into the first model, the first model having been trained with collected prior multiple-input, multiple-output configuration data and collected prior multiple-input, multiple-output performance data, and obtaining, from the first model in response to the inputting of the first dataset, the candidate signal-to-interference-noise ratio data.

16. The non-transitory machine-readable medium of claim 15, wherein the operations further comprise communicating the candidate signal-plus interference to noise ratio data from the first layer to the third layer.

17. The non-transitory machine-readable medium of claim 15, wherein the determining of the candidate signal-to-interference-plus-noise-ratio further comprises inputting multiple-input, multiple-output configuration data associated with an access point, and measurement data associated with the access point to the first model.

18. The non-transitory machine-readable medium of claim 15, wherein the determining of the estimated feasible upper limit signal-to-interference-plus-noise ratio value for the user equipment comprises inputting trajectory data of the user equipment into a third model running as an application on the near-real time radio access network intelligent controller.

19. The non-transitory machine-readable medium of claim 15, wherein the determining of the allocated power data comprises inputting, to the second model, location and speed data of the user equipment, and inputting, to the second model, a low threshold signal-to-interference-plus-noise ratio value corresponding to the candidate signal-to-interference-plus-noise ratio data.

20. The at least one network computing equipment component of claim 1, wherein the determining of the allocated power data is facilitated by an edge-based application.

* * * * *